United States Patent [19]

Iwasa

[11] Patent Number: 5,177,701
[45] Date of Patent: Jan. 5, 1993

[54] COMPUTER AND METHOD FOR PERFORMING IMMEDIATE CALCULATION BY UTILIZING THE COMPUTER

[75] Inventor: Shigeaki Iwasa, Kanagawa, Japan

[73] Assignee: Kabushiki Kaisha Toshiba, Kawasaki, Japan

[21] Appl. No.: 788,439

[22] Filed: Nov. 6, 1991

[30] Foreign Application Priority Data

Nov. 7, 1990 [JP] Japan .................................. 2-299940

[51] Int. Cl.⁵ ............................................. G06F 7/38
[52] U.S. Cl. .................................................. 364/736
[58] Field of Search ......................... 364/736; 395/375

[56] References Cited

U.S. PATENT DOCUMENTS 4,724,517 2/1988 May ..................................... 395/375

OTHER PUBLICATIONS

The SPARC Architecture Manuel Version 8; SPARC International, Inc. 1991, p. 121.
Mips Risc Architecture (R2000/R3000): Gerry Kane; 1987, p. A-39.

Primary Examiner—Jerry Smith
Assistant Examiner—Ngo Chuong
Attorney, Agent, or Firm—Oblon, Spivak, McClelland, Maier & Neustadt

[57] ABSTRACT

A computer for performing immediate calculations by executing an immediate calculation instruction containing a first immediate value and an immediate prefixed instruction containing a second immediate value consists of a register for storing the second immediate value, a prefix state flag for setting a flag in cases where the second immediate value is stored in the register, concatenating unit for concatenating the first immediate value with the second immediate value in cases where the flag in the prefix state flag is set and generating the concatenated immediate value as a first constant, bit extension unit for extending the number of bits in the first immediate value without changing the first immediate value and generating the extended immediate value as a second constant, selector for selecting the first constant generated in the concatenating unit in cases where the flag in the prefix state flag is set and selecting the second constant generated in the bit extension unit in cases where the flag in the prefix state flag is not set, and calculation unit for performing the immediate calculation to process the constant selected in the selector.

8 Claims, 2 Drawing Sheets

FIG.1A

CALCULATION INSTRUCTION

| OPERATION FIELD | DESTINATION REGISTER | FIRST SOURCE REGISTER | SECOND SOURCE REGISTER | IMMEDIATE FIELD |
|---|---|---|---|---|
| 31　24 | 23　20 | 19　16 | 15　12 | 11　0 |

FIG.1B

IMMEDIATE CALCULATION INSTRUCTION

| OPERATION FIELD | DESTINATION REGISTER | FIRST SOURCE REGISTER | 0 0 0 0 | IMMEDIATE FIELD |
|---|---|---|---|---|
| 31　24 | 23　20 | 19　16 | 15　12 | 11　0 |

FIG.2

IMMEDIATE PREFIXED INSTRUCTION

| OPERATION FIELD | 0 0 0 0 | IMMEDIATE FIELD |
|---|---|---|
| 31　24 | 23　20 | 19　0 |

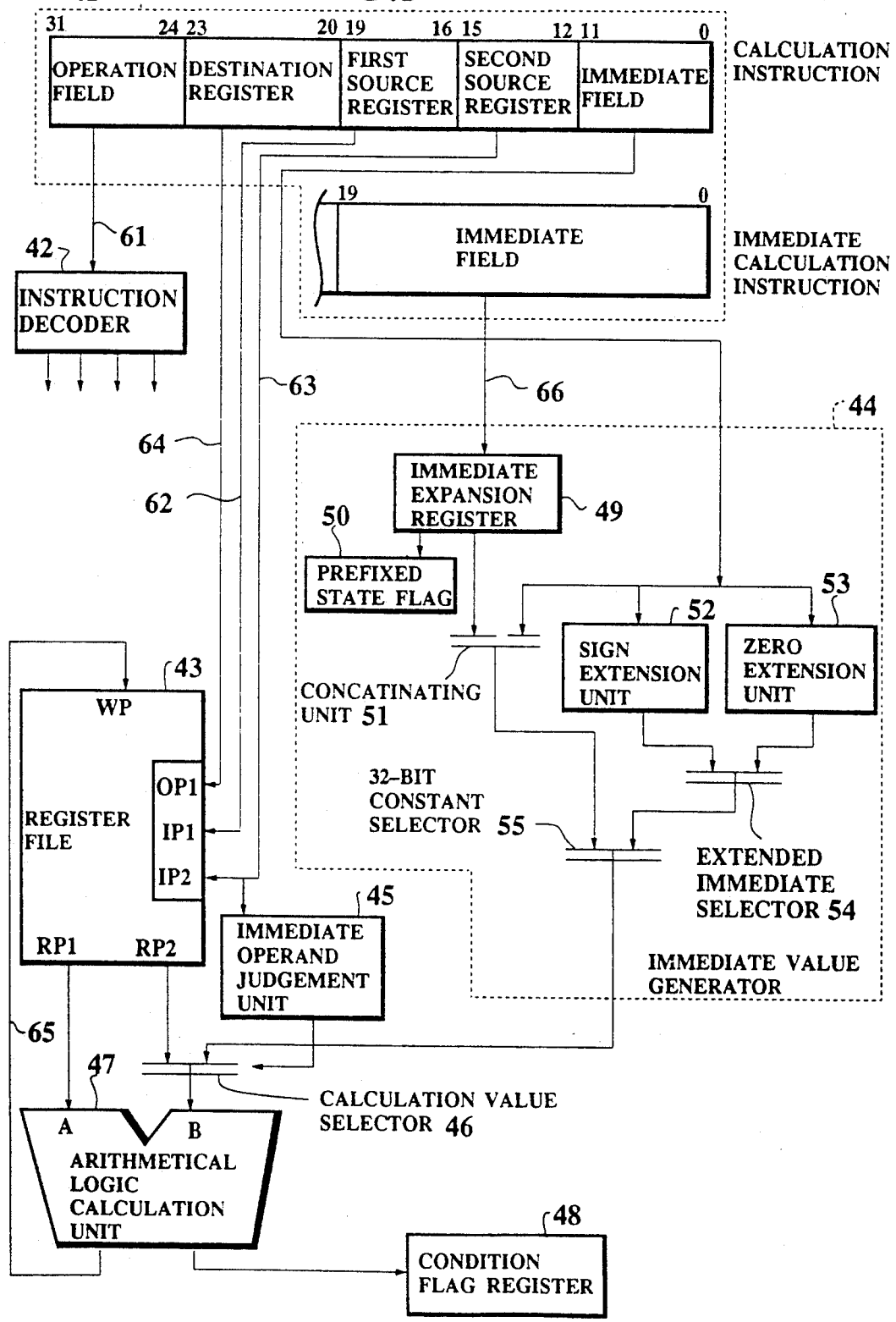

COMPUTER AND METHOD FOR PERFORMING IMMEDIATE CALCULATION BY UTILIZING THE COMPUTER

BACKGROUND OF THE INVENTION

1. Field of the Invention

The present invention relates to a computer which has a calculation instruction, and in particular a computer in which an immediate calculation designated by an immediate calculation instruction can efficiently be performed when the immediate calculation instruction is executed to process a large constant. Moreover, the present invention relates to a method for efficiently performing the immediate calculation by utilizing the computer.

2. Description of Background

In general, an immediate calculation instruction, which is a type of machine instruction stored in a prescribed memory section, is read out to a prescribed register of a computer for performing an immediate calculation (that is, a constant calculation). An immediate operand is stored in the immediate calculation instruction.

In detail, register numbers and an immediate value defined by the immediate operand are respectively contained in bit fields provided in the immediate calculation instruction. The contents of a register specified by the register number are utilized for the immediate calculation. Therefore, when the immediate calculation instruction is executed for the immediate calculation, the immediate value, which is equal to a constant, is utilized with the contents of one register.

In the instruction format of the immediate calculation instruction, the number of bits required to contain the register number or the immediate value is determined as follows.

In cases where the number of registers accessed through software is Nr, the register number can be designated in a field in which the number of bits is equal to $\log_2 Nr$. For example, in a computer with 8 to 16 registers, a field occupying 3 to 4 bits is required for designating the register number. On the other hand, the number of bits occupied by a field for containing all types of immediate values utilized in the computer must be equal to the bit width of the register in which the immediate calculation instruction is stored. The bit width of the register is usually 32 bits.

In a computer in which the instruction length is variable, the field for containing the immediate value can occupy the whole width (32 bits) of the immediate calculation instruction. However, in a practical program, the immediate calculation instruction is frequently utilized for performing a specific immediate calculation in which a small constant is processed. Therefore, because the immediate operand contained in a long bit field is always utilized for all immediate calculations, the bit field in the immediate calculation instruction cannot efficiently be utilized.

To achieve the efficient utilization of the bit field in the immediate calculation instruction and to enhance the performance of the computer, it is effective to remove a part of a bit field which is occasionally utilized and shorten the length of the immediate calculation instruction because the capability for transmitting the immediate calculation instruction from a prescribed memory section to a central processing unit is limited to a prescribed level.

Therefore, a short-form immediate instruction in which the bit width of the field for containing the immediate value is shortened is otherwise prepared separately in many cases for the instruction length variable computer. For example, in the instruction set of the MC6800 series provided by the Motorola corporation, in addition to 32-bit, 16-bit, and 8-bit immediate operand forms, a 3-bit immediate operand form is provided. In cases where the number of bits occupied by the field for containing the immediate value is smaller than the number of bits required for the calculation, the number of bits in the field for the immediate operand is extended to a required bit number to execute the immediate calculation instruction by a sign extender or a zero extender in which a required number of "0"s is merely added to the high-order.

However, because the immediate operand is required for executing almost all of the calculation instructions such as an adding-subtracting calculation instruction, a logical calculation instruction, and a register load instruction, the number of instructions is increased by the preparation of a plurality of calculation instructions and register load instructions. Therefore, it takes a long time to interpret the contents of each instruction.

As mentioned above, in the computer in which the instruction length is variable, there are drawbacks that the bit field arranged to the immediate calculation instruction cannot efficiently be utilized and the number of instructions increases so that the performance of the computerdeteriorates.

To solve the above drawbacks, a computer operated by a so-called RISC method has recently been proposed. In the above computer, the number of immediate calculation instructions is reduced and the length of the instructions is fixed so that calling the instructions and interpreting the contents of the instructions is simplified. As a result, the instructions can be executed at high speed.

In the above computer in which the instruction length is fixed, the length of the general instruction is set at 32 bits, which is equal to the whole length of the instruction read out from a prescribed memory section, or half of 32 bits in many cases. The reason why the length of the general instruction is set at 32 or 16 bits is that many instructions such as the instruction for executing a prescribed calculation by reading out the contents of a plurality of registers can be thoroughly stored in the bit field of 32 bits or 16 bits.

However, in the immediate calculation instruction, many fields such as an operation field for containing an operation code are required. Therefore, the number of bits in the immediate field is limited to less than 32 bits. As a result, a large immediate value cannot be contained in the immediate field in cases where the immediate field is too small to contain the large immediate value. That is, the immediate calculation cannot be performed while utilizing a large immediate value.

Therefore, in the immediate calculation in which an immediate value requiring a larger immediate field than the immediate field is utilized, a constant designated by the immediate values initially calculated, for example, in a register file, and then the immediate calculation is performed by reading out both the calculated constant stored in a register and an immediate operand to be processed in the immediate calculation instruction stored in another register. In short, the calculation is performed after the constant and the immediate operand are read out from a plurality of registers. The above calculation is called "calculation between registers".

In other words, in cases where the number of bits in the immediate field is equal to or more than half of the number of bits occupied by the constant, four types of instructions are required. Specifically, the instructions are a load instruction for transmitting a part of the constant C1 to a working register, a shift instruction for shifting that part of the constant C1 to the high-order in the working register, an immediate logical OR instruction for transmitting another part of the specific constant C2 to the low-order in the working register and generating the constant, and a calculation instruction for performing the calculation after the constant and the operation code are read out from a plurality of registers. Therefore, four instructions are executed in the above calculation, while the immediate calculation can generally be performed with a single instruction.

Moreover, in cases where the number of bits occupied by the immediate field is less than half of the number of bits occupied by the specific constant, the required number of shift instructions and the immediate logical OR instructions must be repeated to generate the constant.

As mentioned above, in the computer in which the instruction length is fixed, there is the drawback that it takes a long time to perform the immediate calculation in which a large constant is utilized. Moreover, there is another drawback in that a working register for storing the calculated constant is required.

SUMMARY OF THE INVENTION

An object of the present invention is to provide, with due consideration to the drawbacks of such conventional computer, a computer in which the immediate calculation to process a large constant can efficiently be performed even if a computer in which the instruction length is fixed is used for the immediate calculation.

The above object is achieved by the provision of a computer for performing an immediate calculation to execute an immediate calculation instruction which is a type of calculation instruction, comprising:

instruction registering means for storing either the calculation instruction containing a first immediate value or an immediate prefixed instruction containing a second immediate value, the immediate prefixed instruction being executed prior to the execution of the immediate calculation instruction;

instruction interpretation means for interpreting whether the instruction stored in the instruction registering means is the calculation instruction or the immediate prefixed instruction;

immediate registering means for storing the second immediate value contained in the immediate prefixed instruction in cases where the instruction interpretation means interprets the instruction stored in the instruction registering means to be the immediate prefixed instruction;

prefix state flag means for setting a flag when the second immediate value contained in the immediate prefixed instruction is stored in the immediate registering means and resetting the flag when the execution of the calculation instruction is finished;

concatenation and constant generating means for (1) concatenating first serial bits forming the first immediate value contained in the calculation instruction stored in the instruction registering means with second serial bits forming the second immediate value contained in the immediate prefixed instruction in cases where the flag provided in the prefix state flag means is set and (2) generating the concatenated immediate value as a first constant;

bit extension and constant generating means for (1) extending the number of bits represented by the first immediate value which is contained in the immediate calculation instruction stored in the instruction registering means to the number of bits represented by the first constant generated by the concatenation and constant generating means without changing the first immediate value in cases where the instruction interpretation means interprets the instruction stored in the instruction registering means to be the calculation instruction and (2) generating the extended first immediate value as a second constant;

selection means for selecting the first constant generated in the concatenation and constant generating means in cases where the flag provided in the prefix state flag means is set and selecting the second constant generated in the bit extension and constant generating means in cases where the flag provided in the prefix state flag means is reset;

judgement means for judging whether or not the instruction stored in the instruction registering means is the immediate calculation instruction; and immediate calculation performing means for performing the immediate calculation to process the constant selected in the selection means in cases where it is judged by the judgement means that the immediate calculation instruction is stored in the instruction registering means.

In the above configuration of the computer according to the present invention, in cases where the number of bits represented by a constant to be processed by the immediate calculation exceeds the length of an immediate field which contains the first immediate value and is provided in the immediate calculation instruction, some of serial bits forming the constant are contained in the immediate field of the immediate calculation instruction. In addition, the remaining serial bits forming the constant are contained in an immediate field which contains the second immediate value and is provided in the immediate prefixed instruction.

The immediate prefixed instruction is executed just before the execution of the immediate calculation instruction. Therefore, when the instruction interpretation means interprets the immediate prefixed instruction to be stored in the instruction registering means under the control of a prescribed controller, the second immediate value contained in the immediate prefixed instruction is stored in the immediate registering means and the flag in the prefix state flag means is set to declare the registration of the second immediate value.

Following the execution of the immediate prefixed instruction, the immediate calculation instruction is executed. By the execution of the immediate calculation instruction, the serial bits contained in the immediate field of the immediate calculation instruction and the serial bits stored in the immediate registering means are concatenated in the concatenation and constant generating means under the control of the prescribed controller so that the constant designated by the concatenated serial bits is generated.

The generated constant is then transmitted to the immediate calculation performing means through the selection means because the flag in the prefix state flag means is set so that the immediate calculation is performed to process the constant according to the immediate calculation instruction.

On the other hand, in cases where the number of bits represented by a constant to be processed by the immediate calculation is equal to or less than the length of an immediate field which contains the first immediate value and is provided in the immediate calculation instruction, the constant can be contained in the immediate field of the immediate calculation instruction.

In this case, the immediate prefixed instruction is not stored in the instruction registering means under the control of the prescribed controller. Therefore, the immediate prefixed instruction is not executed and the flag in the prefix state flag means remains reset.

Therefore, by the execution of the immediate calculation instruction under the control of the prescribed controller, the number of bits represented by the constant is extended to that represented by the concatenated value in the bit extension and constant generating means so that the constant with an extended number of bits is generated.

Then, the generated constant is transmitted to the immediate calculation performing means through the selection means because the flag in the prefix state flag means is reset so that the immediate calculation is performed to process the constant according to the immediate calculation instruction.

It is preferred that the immediate calculation performing means comprise:

a register file for storing first and second source operands in registers designated by register numbers contained in the calculation instruction;

a calculation value selector for selecting the constant selected in the selection means in cases where the judgement means judges that the immediate calculation instruction is stored in the instruction registering means, and for selecting the first source operand stored in the register file in cases where the judgement means judges that the calculation instruction except for the immediate calculation instruction is stored in the instruction registering means; and an arithmetical logic calculation unit for performing the immediate calculation so as to process both the second source operand stored in the register file and the constant selected in the calculation value selector in cases where the judgement means judges that the immediate calculation instruction is stored in the instruction registering means.

Also, it is preferred that the instruction interpretation means interpret whether or not the first immediate value contained in the immediate calculation instruction stored in the instruction registering means has a sign, and the bit extension and constant generating means comprises:

a zero extension unit for adding "0" bits to the high-order of the first immediate value contained in the calculation instruction;

a sign extension unit for adding "0" bits or "1" bits to the high-order of the first immediate value contained in the calculation instruction according to the sign of the first immediate value; and an extended immediate selector for selecting the first immediate value added the prescribed bits by the sign extension unit as the second constant in cases where the instruction interpretation means interprets the first immediate value to have the sign, and for selecting the first immediate value added the bits by the zero extension unit as the second constant in cases where the instruction interpretation means interprets the first immediate value to have no sign.

In the above configuration, the immediate calculation is performed whether the immediate value has a sign or not.

Moreover, the above object is achieved by the provision of a method for performing an immediate calculation to execute an immediate calculation instruction which is a type of calculation instruction by utilizing a computer, comprising:

storing either the calculation instruction containing a first immediate value or an immediate prefixed instruction containing a second immediate value in an instruction register, the immediate prefixed instruction being executed prior to the execution of the immediate calculation instruction;

interpreting whether the instruction stored in the instruction register is the calculation instruction or the immediate prefixed instruction in an instruction decoder;

storing the second immediate value contained in the immediate prefixed instruction in a second immediate register in cases where the instruction decoder interprets the instruction stored in the instruction register to be the immediate prefixed instruction;

setting a flag in a prefix state flag when the second immediate value contained in the immediate prefixed instruction is stored in the second immediate register and resetting the flag when the calculation instruction has been executed;

concatenating first serial bits forming the first immediate value contained in the calculation instruction stored in the instruction register with second serial bits forming the second immediate value contained in the immediate prefixed instruction in a concatenation unit in cases where the flag in the prefix state flag is set;

generating the immediate value concatenated in the concatenation unit as a first constant;

extending the number of bits represented by the first immediate value contained in the immediate calculation instruction stored in the instruction register to the number of bits represented by the first constant without changing the first immediate value in a bit extender in cases where the instruction decoder interprets the instruction stored in the instruction register to be the calculation instruction;

generating the first immediate value extended by the bit extender as a second constant;

selecting the first constant generated in the concatenation unit in a constant selector in cases where the flag in the prefix state flag is set and selecting the second constant generated in the bit extender in the constant selector in cases where the flag in the prefix state flag is reset;

judging whether or not the instruction stored in the instruction register is the immediate calculation instruction in a judgement unit; and performing the immediate calculation to process the constant selected in the constant selector in cases where the judgement unit judges that the immediate calculation instruction is stored in the instruction register.

In the above steps, the immediate calculation is efficiently performed even if a large constant is provided.

BRIEF DESCRIPTION OF THE DRAWINGS

FIG. 1A shows a format of an calculation instruction which is a type of machine instruction executed in a computer in which the instruction length is fixed according to a preferred embodiment of the present invention.

FIG. 1B shows a format of an immediate calculation instruction which is a type of calculation instruction shown in FIG. 1A.

FIG. 2 shows a format of an immediate prefixed instruction which is a type of machine instruction executed in a computer in which the instruction length is fixed according to a preferred embodiment of the present invention.

FIG. 3 is a block diagram showing a part of the computer structure.

DETAILED DESCRIPTION OF THE PREFERRED EMBODIMENTS

Preferred embodiments of a computer according to the present invention is described with reference to FIGS. 1 to 3.

FIG. 1A shows a format of an calculation instruction which is a type of machine instruction executed in a computer in which an instruction length is fixed according to a preferred embodiment of the present invention.

FIG. 1B shows a format of an immediate calculation instruction which is a type of calculation instruction shown in FIG. 1A.

As shown in FIG. 1A, a machine instruction is formed by a 32-bit fixed-length format. In detail, an operation field is provided in the upper 8 bits (bits No. 24 to 31) to contain an operation code designating a type of instruction.

In cases where the machine instruction is the calculation instruction shown in FIG. 1A, a destination register is assigned to the following 4 bits (bits No. 20 to 23) to hold a register number by which a register in a register file is designated to store a calculated result obtained by the execution of the instruction designated by the operation code in the operation field. Moreover, first and second source registers are assigned to the following 4 bits (bits No. 16 to 19, 12 to 15) to hold register numbers by which the other registers in the register file are designated to store first and second source operands processed by the execution of the instruction designated by the operation code.

Finally, an immediate field is assigned to the following 12 bits (bits No. 0 to 11) to contain an immediate operand. In cases where a constant to be processed by the execution of the immediate calculation instruction is represented by a bit length of more than 12 bits, the low-order 12 bits of the constant are contained in the immediate field as the immediate operand. That is, the remaining high-order bits of the constant are not contained in the immediate field. On the other hand, in cases where the constant is represented by a bit length of not more than 12 bits, all the bits of the constant are contained in the immediate field as the immediate operand.

Specially, in cases where the register number contained in the second source register is represented by 4 bits of "0"s, the calculation instruction shown in FIG. 1A is equivalent to the immediate calculation instruction shown in FIG. 1B. That is, an immediate calculation (that is, a constant calculation) is performed to process the constant contained in the immediate field.

In the operation field, either a calculation instruction for executing the "calculation between registers" described hereinbefore or the immediate calculation or a prefixed instruction which is executed just before the execution of the calculation instruction is contained as one of the instructions designated by the operation code.

FIG. 2 shows a format of an immediate prefixed instruction which is a type of machine instruction executed in a computer in which an instruction length is fixed according to a preferred embodiment of the present invention.

As shown in FIG. 2, the machine instruction formed by a 32-bit fixed-length format has an operation field provided in the upper 8 bits (bits No. 24 to 31). A prefixed instruction is contained as the operation code in the operation field. In the present invention, the machine instruction containing the prefixed instruction as shown in FIG. 2 is executed just before the execution of the immediate calculation instruction so that the machine instruction shown in FIG. 2 is an immediate prefixed instruction.

In the following bit field (bits No. 20 to 23), 4 bits of "0"s are contained.

In the lower bits (bits No. 0 to 19), in cases where the constant is represented by a bit length of more than 12 bits because the value of the constant is large, the high-order of the constant is provided as the immediate operand because the high-order of the constant are not contained in the operand field in the immediate calculation instruction.

A code generator in an assembler judges whether or not the above operation for dividing the serial bits forming the constant into the high-order bits and the low-order bits is necessary. The operation is performed by the code generator.

Accordingly, in cases where the operation code designating the calculation instruction is contained in the operation field and the register number, except for 4 bits of "0"s, is contained in the second source register, the machine instruction is not the immediate calculation instruction but the instruction for performing the "calculation between registers" as mentioned in the description of background.

On the other hand, in cases where the operation code designating the calculation instruction is contained in the operation field and 4 bits of "0"s designating the immediate calculation are contained in the second source register, the machine instruction represents the immediate calculation instruction for performing the immediate calculation.

In cases where the operation code designating the prefixed instruction is contained in the operation field, the machine instruction is the immediate prefixed instruction without regard to the number in the bits No. 12 to 15.

In a computer for executing the immediate calculation instruction mentioned above, a 32-bit arithmetical logic calculation unit is arranged so that a maximum of 32 bits is required for the immediate field.

However, as shown in FIGS. 1A and 1B, the first and second source registers and the operation field are provided in the immediate calculation instruction. Moreover, because the above computer is generally provided with a register file in which fifteen 32-bit registers are provided, the number of registers is equal to 15 ($Nr=15$) so that the number of bits assigned to register fields such as the source registers and the destination register must be 4 ($\log_2 Nr = 4$). As a result, the immediate field can occupy no more than 12 bits.

In the above computer, a register in the register file, which contains fifteen registers, is selected according to the register number contained in the register field provided in the immediate calculation instruction.

In cases where a bit pattern in each register field is "0000", a specific operation is performed. That is, even if the register number contained in each register field is transmitted to the register file to access a corresponding register provided in the register file under the control of a prescribed controller, the corresponding register is not accessed by the program.

In detail, in cases where a value designating the destination register is "0000", even if a calculated value is obtained in the register file and transmitted to a write port provided in the register file, the calculated value is not stored in any register in the register file because the immediate prefixed instruction is being executed. As a result, the calculated value is discarded.

Moreover, in cases where a value designating the first source register is "0000", the first source operand is output from a first readout port in the register file. The first source operand is then transmitted to the arithmetical logic calculation unit so that the unit is provided with the value "0". This operation is performed to clear the contents of a certain register in the register file by executing the AND instruction contained in the operation field, or to execute a sign judgement or data transmission between the registers in the register file. This operation is not important in the present invention. Therefore, a detailed description is omitted.

Further, in cases where a value designating the second source register is "0000", the immediate operand in the immediate field is utilized in exchange for the second source operand in the arithmetical logic calculation unit as mentioned hereinbefore. Therefore, this operation is performed when the immediate calculation instruction is executed to process the constant.

As mentioned above, by specifying the value contained in the destination register or the source registers, when a single calculation instruction provided with the value "0000" is executed, a prescribed calculation can be specified and performed. In the above operation, the value provided for the above calculation instruction is judged by the code generator in the assembler.

Next, a specific structural part of the computer is shown in FIG. 3 to describe a preferred embodiment according to the present invention.

As shown in FIG. 3, a circuit 40 in the central processing unit in the computer, for performing the immediate calculation to process a constant by executing the immediate prefixed instruction and the immediate calculation instruction in which the constant is contained as mentioned above, comprises:

an instruction register 41 for storing a calculation instruction such as the immediate calculation instruction shown in FIG. 1B or the immediate prefixed instruction shown in FIG. 2, the register 41 having 32-bit field in all;

an instruction decoder 42 for interpreting the operation code contained in the operation field provided in bits No. 24 to 31 in the instruction register 41;

a register file 43 for storing first and second source operands and a calculated value in prescribed registers, the registers storing the first and second source operands being designated by the register numbers contained in the first and second source registers and the register storing the calculation result designated by the register number in the destination register;

an immediate value generator 44 for reading the immediate operand in the immediate field provided in the bits No. 0 to 19 as the high-order of the constant in cases where the immediate prefixed instruction is stored in the instruction register 41, reading the immediate operand in the immediate field provided in the bits No. 0 to 11 as the low-order of the constant in cases where the immediate calculation instruction is stored in the instruction register 41, and generating the constant by concatenating the immediate operands;

an immediate operand judgement unit 45 for judging that a type of calculation performed in the circuit 40 is the "calculation between registers" in cases where the register number in the bits No. 12 to 15 of the instruction register 41 is not 4 bits of "0"s and judging that a type of calculation performed in the circuit 40 is the immediate calculation in cases where the register number in the bits No. 12 to 15 of the instruction register 41 is 4 bits of "0"s;

a calculation value selector 46 for selecting the constant generated in the immediate value generator 44 when the immediate calculation is judged by the immediate operand judgement unit 45 and selecting the second source operand stored in a register designated by the register number in the second source register assigned to the instruction register 41 when the "calculation between registers" is judged by the immediate operand judgement unit 45, the register being arranged in the register file 43;

an arithmetical logic calculation unit 47 for performing the calculation designated by the calculation instruction to process both the calculation value selected by the calculation value selector 46 and the first source operand stored in a register designated by the register number in the first source register assigned to the instruction register 41, in cases where the calculation instruction is stored in the instruction register 41, the calculation result being obtained by the calculation; and a condition flag register 48 for storing a condition required for a conditional branch instruction executed later, the conditional branch instruction being executed for the calculation performed in the arithmetical logic calculation unit 47.

The operation code in the immediate prefixed or calculation instruction is transmitted to the instruction decoder 42 through a wire 61.

The register number in the first source register assigned to the calculation instruction is transmitted to an input port IP1 of the register file 43 through a wire 62.

The register number in the second source register assigned to the immediate calculation instruction is transmitted to both an input port IP2 of the register file 43 through a wire 63 and the immediate operand judgement unit 45.

The calculation result obtained in the arithmetical logic calculation unit 47 is transmitted to the register file 43 through a wire 65.

In cases where the immediate calculation instruction is stored in the instruction register 41, the register number in the second source register is 4 bits of "0"s. Therefore, the immediate operand judgement unit 45 transmits the constant generated in the immediate value generator 44 to the arithmetic logic calculation unit 47 through the calculation value selector 46.

Thereafter, in the arithmetic logic calculation unit 47, the first source operand in the register file 43 and the constant generated in the immediate value generator 44 are processed according to the operation code in the operation field of the immediate calculation instruction, so that a calculation result is obtained in the arithmetic logic calculation unit 47. Thereafter, the calculation result is transmitted from the arithmetic logic calculation unit 47 to a write port WP of the register file 43 through the wire 65, so that the calculation result is stored in a register designated by the register number in the destination register assigned to the immediate calculation instruction.

On the other hand, in cases where the immediate prefixed instruction is stored in the instruction register 41, the register number "0000" in the bits No. 20 to 23 is transmitted to the output port OP1 of the register file 43. Therefore, the calculation result provided to the write port WP of the register file 43 is not stored in any register in the register file 43.

Next, the detailed configuration of the immediate value generator 44, which is the feature of the present invention, is described as follows.

The immediate value generator 44 comprises:

an immediate expansion register 49 for storing the 20-bit immediate operand in the immediate field assigned to the immediate prefixed instruction stored in the instruction register 41 through a wire 66;

a prefixed state flag 50 for setting a flag in cases where the immediate operand is stored in the immediate value generator 44 and resetting the flag in cases where the calculation instruction has been executed;

a concatenating unit 51 for concatenating the 12-bit immediate operand in the immediate calculation instruction with the 20-bit immediate operand stored in the immediate expansion register 49, the 20-bit immediate operand being occupying the high-order position and the 12-bit immediate operand occupying the low-order position to generate the 32-bit constant;

a sign extension unit 52 for extending the 12-bit immediate operand in the immediate field assigned to the immediate calculation instruction to a 32-bit immediate operand without changing the value of the immediate operand with consideration of a sign given to the immediate operand, twenty bits of "0"s or "1"s being added to the high-order position of the 12-bit immediate operand according to the sign;

a zero extension unit 53 for extending the 12-bit immediate operand in the immediate calculation instruction to a 32-bit immediate operand without changing the value of the immediate operand by adding twenty bits of "0"s to the high-order position of the 12-bit immediate operand;

an extended immediate selector 54 for selecting the 32-bit immediate operand extended by the sign extension unit 52 in cases where the 12-bit immediate operand in the immediate field assigned to the immediate calculation instruction has a sign, and for selecting the 32-bit immediate operand extended by the zero extension unit 53 in cases where the 12-bit immediate operand in the immediate field assigned to the immediate calculation instruction has no sign, the selected 32-bit immediate operand being regarded as the constant; and 32-bit constant selector 55 for selecting the 32-bit constant generated by the concatenating unit 51 in cases where the flag in the prefixed state flag 50 is set and, for selecting the 32-bit constant selected by the extended immediate selector 54 in cases where the flag in the prefixed state flag 50 is reset.

In the above configuration, the operation in the computer is described as follows.

For convenience of description, the immediate calculation instruction or the immediate prefixed instruction has already been stored in the instruction register 41. A method for storing the instruction in the instruction register 41 is well-known.

First, in the case where the instruction decoder 42 interprets the immediate prefixed instruction to be stored in the instruction register 41, the operation in the circuit shown in FIG. 3 is described.

The immediate operand in the immediate field (bits No. 0 to 19) is transmitted to the immediate expansion register 49 so that the flag in the prefixed state flag 50 is set. When the flag in the prefixed state flag 50 is set, the renewal of a value stored in the condition flag register 48 is prohibited. The renewal of the value is prohibited to prevent the values stored in the register file 43 and the condition flag register 48 from being changed by the execution of the immediate prefixed instruction.

The immediate prefixed instruction is executed in advance prior to the execution of the immediate calculation instruction. Therefore, after the immediate prefixed instruction has been executed, the program ensures that no interrupt is received by the circuit shown in FIG. 3. Or, in cases where an interrupt is received by the circuit, the flag state in the prefixed state flag 50 and the value stored in the immediate expansion register 49 must be transmitted to a prescribed memory to prevent the value from being changed.

When an instruction, except for the immediate prefixed instruction, has been executed, the flag in the prefixed state flag 50 is reset. Therefore, in cases where the immediate calculation instruction is executed without following the execution of the immediate prefixed instruction, the immediate calculation can be executed by utilizing only the immediate operand contained in the immediate field assigned to the immediate calculation instruction.

On the other hand, when the immediate operand in the immediate field assigned to the immediate prefixed instruction is transmitted to the immediate expansion register 49, the contents of the bits No. 12 to 15 and the bits No. 16 to 19 of the immediate prefixed instruction are transmitted to the input ports IP1, IP2 of the register file 43. In this case, because the immediate prefixed instruction is stored in the instruction register 41, the data transmitted to the input ports IP1, IP2 is a part of the immediate operand.

Thereafter, the data of the registers in the register file 43, designated by the register numbers contained in the bits No. 12 to 15 and the bits No. 16 to 19 assigned to the immediate prefixed instruction, are read out from readout ports RP1, RP2 of the register file 43. The data read out from the readout port RP2 is transmitted to the arithmetical logic calculation unit 47 through the calculation value selector 46 in cases where the data is not 4 bits of "0"s. The data read out from the readout port RP1 is directly transmitted to the arithmetical logic calculation unit 47.

Moreover, when the operation code in the bits No. 24 to 31 of the immediate prefixed instruction is interpreted by the instruction decoder 42, a certain bit pattern is transmitted from the instruction decoder 42 to a prescribed controller (not shown). Therefore, in the arithmetical logic calculation unit 47, a certain calculation is performed to obtain a certain calculation result according to an instruction designated by the certain bit pattern provided from the instruction decoder 42 under the control of the prescribed controller.

However, because the register number in the bits No. 20 to 23 of the immediate prefixed instruction is 4 bits of "0"s and is transmitted to the output port OP1 of the register file 43, the calculation result transmitted from the arithmetical logic calculation unit 46 to the register file 43 through the wire 65 is not stored in any register in the register file 43.

Moreover, because the renewal of the value stored in the condition flag register 48 is prohibited, a flag in the condition flag register 48 is not set. Therefore, an improper operation such as changing the registered values stored in the register file 43 and the condition flag register 48 is not performed even if the immediate prefixed instruction is executed.

Second, the operation in the circuit shown in FIG. 3 is described for the case where the instruction decoder 42 interprets the calculation instruction to be stored in the instruction register 41.

When the calculation instruction is interpreted by the instruction decoder 42, a signal for setting the flag provided in the condition flag register 48 is transmitted to the condition flag register 48 so that the condition flag register 48 becomes operable. Moreover, a signal indicating whether or not the immediate operand in the immediate field has a sign is transmitted from the instruction decoder 42 to a prescribed controller (not shown) in the immediate value generator 44.

Thereafter, according to the flag condition in the prefixed state flag 50 and the signal indicating whether or not the immediate operand has a sign, three types of operations are performed in the immediate generator 44.

In a first operation, in which the immediate prefixed instruction has been executed before the execution of the calculation instruction, the flag in the prefixed state flag 50 is set because the immediate operand of the immediate prefixed instruction has been stored in the immediate expansion register 49.

In this case, the high-order 20 bits of the constant are stored in the immediate expansion register 49 as the immediate operand because the immediate prefixed instruction has been executed in advance. Therefore, the immediate operand in the immediate expansion register 49 is transmitted to the concatenating unit 51 as the high-order 20 bits. Moreover, because low-order 12 bits of the constant are contained in the immediate field assigned to the calculation instruction as the immediate operand, the immediate operand is transmitted to the concatenating unit 51 as the low-order 12 bits. In the concatenating unit, both the immediate operands are concatenated to generate a 32-bit constant. Thereafter, the generated 32-bit constant is transmitted to the calculation value selector 46 through the 32-bit constant selector 55.

In a second operation, in which the immediate prefixed instruction has not been executed before the execution of the calculation instruction, the flag in the prefixed state flag 50 is not set. Moreover, in the second operation, the immediate operand in the immediate calculation instruction has a sign.

In this case, because the immediate prefixed instruction is not executed in advance, an effective immediate operand is not stored in the immediate expansion register 49. Therefore, the immediate operand in the immediate field assigned to the calculation instruction is extended to a 32-bit immediate operand by the sign extension unit 52. Thereafter, the 32-bit immediate operand, which is regarded as the 32-bit constant, is transmitted to the calculation value selector 46 through the extended immediate selector 54 and the 32-bit constant selector 55.

In a third operation, in which the immediate prefixed instruction has not been executed before the execution of the calculation instruction, the flag in the prefixed state flag 50 is not set. Moreover, in the third operation, the immediate operand in the immediate calculation instruction has no sign.

In this case, because the immediate prefixed instruction is not executed in advance in the same manner as in the second operation, the 12-bit immediate operand in the immediate field assigned to the calculation instruction is extended to a 32-bit immediate operand by the zero extension unit 53. Thereafter, the 32-bit immediate operand, which is regarded as the 32-bit constant, is transmitted to the calculation value selector 46 through the extended immediate selector 54 and the 32-bit constant selector 55.

Thereafter, in cases where the register number in the second source register assigned to the calculation instruction is 4 bits of "0"s in the first to third operations, the immediate calculation is performed while the 32-bit constant generated in the immediate value generator 44 is utilized.

In detail, the 32-bit constant transmitted from the 32-bit constant selector 55 is selected by the calculation value selector 46 because the immediate operand judgement unit 45 judges that the instruction stored in the instruction register 41 is the immediate calculation instruction. Thereafter, the 32-bit constant is provided to an input port B of the arithmetical logic calculation unit 47.

Moreover, the register number in the first source register assigned to the immediate calculation instruction is transmitted to the input port IP1 of the register file 43. Therefore, the first source operand stored in a register designated by the register number is provided from the register file 43 to an input port A of the arithmetical logic calculation unit 47.

Thereafter, the immediate calculation is performed in the arithmetical logic calculation unit 47 to process both the 32-bit constant and the first source operand provided from the register file 43, so that a calculation result is obtained. The calculation result is transmitted to the register file 43 to be stored in a prescribed register which is designated by the register number in the destination register assigned to the immediate calculation instruction. Moreover, when the immediate calculation has been executed, the flag of the prefixed state register 50 is reset.

On the other hand, in cases where the register number in the second source register is not 4 bits of "0"s in the first to third operations, the "calculation between registers" is performed.

In detail, the register number in the second source register assigned to the immediate calculation instruction is transmitted to both the immediate operand judgement unit 45 and the input port IP2 of the register file 43. In the register file 43, the second source operand stored in a register designated by the register number in the second source register is transmitted to the calculation value selector 46 through the readout port RP2.

Moreover, the immediate operand judgement unit 45 judges that the instruction stored in the instruction register 41 is not the immediate calculation instruction because the second source register storing not 4 bits of "0"s is transmitted to the judgement unit 45. Therefore, the second source operand in the register file 43 is selected in the calculation value selector 46, so that the second source operand is provided to the input port B of the arithmetical logic calculation unit 47.

Further, the first source operand stored in the register file 43 is provided to the input port A of the arithmetical logic calculation unit 47 in the same manner as in the immediate calculation.

Thereafter, the "calculation between registers" is performed in the arithmetical logic calculation unit 47 to process the first and second source operands provided from the register file 43, so that a calculation result is obtained. The calculation result is stored in the register file 43 and in the same manner as in the immediate calculation.

Accordingly, in the computer in which the instruction length is fixed according to the present invention, the bit length of the immediate field of the immediate calculation instruction can be extended to the prescribed bit length required for the immediate calculation by adding only the immediate prefixed instruction. Therefore, the increase in the number of the instructions can be restrained and the time required to interpret the increased instructions does not increase.

Moreover, because small constants is the great part of constants stored in the immediate calculations and can be contained in the immediate field assigned to the immediate calculation instruction, when a small constant is processed for the immediate calculation, the immediate prefixed instruction is not executed. Therefore, the immediate calculation can be performed by executing only the conventional immediate calculation instruction without increasing the number of instructions.

Further, compared with the conventional computer in which the bit length of the immediate field is limited, a prescribed immediate calculation can be performed by executing the smallest number of instructions. Therefore, a working register for storing divided constants in turn by executing a load instruction, a shift instruction, an immediate logical OR instruction, and a calculation instruction is not necessary.

Furthermore, in the computer in which a pipeline operation is performed, in cases where a constant is calculated by utilizing a working register in the conventional computer, if a series of calculations is continued, a so-called register hazard occurs. That is, before registering a calculated result in a register, the calculated result is required for a next calculation so that the series of calculations is interrupted. Therefore, calculation efficiency deteriorates. However, no working register is utilized in the present invention, and a series of calculations is continued without being interrupted so that the calculation can be efficiently performed.

Further, in a super scalar type computer with a plurality of pipelines, a plurality of instructions cannot be executed because the register hazard occurs. Therefore, a single pipeline is utilized so that the calculation efficiency deteriorates. However, in the present invention, a plurality of instructions can be executed because the register hazard does not occur.

In the above embodiment, in cases where the second source operand in the second source register field assigned to the immediate calculation instruction is 4 bits of "0"s, the immediate calculation is performed. However, in cases where the program ensures that the immediate calculation is designated in the operation field, the immediate calculation can efficiently be executed in the same manner as in the above embodiment.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A computer for performing an immediate calculation to execute an immediate calculation instruction which is a type of calculation instruction, comprising:
   instruction registering means for storing either the calculation instruction containing a first immediate value or an immediate prefixed instruction containing a second immediate value, the immediate prefixed instruction being executed prior to the execution of the immediate calculation instruction;
   instruction interpretation means for interpreting whether the instruction stored in the instruction registering means is the calculation instruction or the immediate prefixed instruction;
   immediate registering means for storing the second immediate value contained in the immediate prefixed instruction in cases where the instruction interpretation means interprets the instruction stored in the instruction registering means to be the immediate prefixed instruction;
   prefix state flag means for setting a flag when the second immediate value contained in the immediate prefixed instruction is stored in the immediate registering means and resetting the flag when the execution of the calculation instruction is finished;
   concatenation and constant generating means for
   (1) concatenating first serial bits forming the first immediate value contained in the calculation instruction stored in the instruction registering means with second serial bits forming the second immediate value contained in the immediate prefixed instruction in cases where the flag provided in the prefix state flag means is set and
   (2) generating the concatenated immediate value as a first constant;
   bit extension and constant generating means for
   (1) extending the number of bits represented by the first immediate value which is contained in the immediate calculation instruction stored in the instruction registering means to the number of bits represented by the first constant generated by the concatenation and constant generating means without changing the first immediate value in cases where the instruction interpretation means interprets the instruction stored in the instruction registering means to be the calculation instruction and
   (2) generating the extended first immediate value as a second constant;
   selection means for selecting the first constant generated in the concatenation and constant generating means in cases where the flag provided in the prefix state flag means is set and selecting the second constant generated in the bit extension and constant generating means in cases where the flag provided in the prefix state flag means is reset;

judgement means for judging whether or not the instruction stored in the instruction registering means is the immediate calculation instruction; and immediate calculation performing means for performing the immediate calculation to process the constant selected in the selection means in cases where the judgement means judges that the immediate calculation instruction is stored in the instruction registering means.

2. A computer according to the claim 1 in which the immediate calculation performing means comprises:

a register file for storing first and second source operands in registers designated by register numbers contained in the calculation instruction;

a calculation value selector for
  (1) selecting the constant selected in the selection means in cases where the judgement means judges that the immediate calculation instruction is stored in the instruction registering means and
  (2) selecting the first source operand stored in the register file in cases where the judgement means judges that the calculation instruction except for the immediate calculation instruction is stored in the instruction registering means; and an arithmetical logic calculation unit for performing the immediate calculation so as to process both the second source operand stored in the register file and the constant selected in the calculation value selector in cases where the judgement means judges that the immediate calculation instruction is stored in the instruction registering means.

3. A computer according to the claim 1 in which the judgement means judges that the instruction stored in the instruction registering means is the immediate calculation instruction in cases where a content stored in a prescribed register field assigned to the instruction registering means is a specific value.

4. A computer according to the claim 1 in which the instruction interpretation means interprets whether or not the first immediate value contained in the immediate calculation instruction stored in the instruction registering means has a sign. and the bit extension and constant generating means comprises:

a zero extension unit for adding "0" bits to the high-order of the first immediate value contained in the calculation instruction;

a sign extension unit for adding "0" or "1" bits to the high-order of the first immediate value contained in the calculation instruction according to the sign of the first immediate value; and an extended immediate selector for
  (1) selecting the first immediate value added the prescribed bits by the sign extension unit as the second constant in cases where the instruction interpretation means interprets the first immediate value to have the sign and
  (2) selecting the first immediate value added the bits by the zero extension unit as the second constant in cases where the instruction interpretation means interprets the first immediate value to have no sign.

5. A computer for performing an immediate calculation, comprising:

a calculation instruction for storing a first operation code which represents a general calculation, a plurality of register numbers, and a first immediate value, the calculation instruction representing an immediate calculation instruction for executing the immediate calculation in cases where one of the register numbers is a first specific number;

an immediate prefixed instruction for storing a second operation code which represents no effective calculation, a second specific register number, and a second immediate value;

register file means for storing first and second source operands and a calculation result in prescribed registers which are designated by the register numbers stored in the calculation instruction;

instruction registering means for storing the immediate prefixed instruction and the calculation instruction in turn;

immediate value generating means for generating a new immediate value by concatinating the first immediate value stored in the immediate calculation instruction with the second immediate value stored in the immediate prefixed instruction; and immediate calculation performing means for
  (1) performing the general calculation according to the first operation code stored in the calculation instruction by utilizing both the first and second source operands stored in the register file means
  (2) performing the immediate calculation according to the first operation code stored in the immediate calculation instruction by utilizing both the first source operand stored in the register file means and the new immediate value generated in the immediate value generating means in cases where the instruction registering means stores the first specific register number and
  (3) performing no effective calculation according to the second operation code stored in the immediate prefixed instruction in cases where the instruction registering means stores the second specific register number.

6. A computer according to the claim 5 in which the first specific number stored in the immediate calculation instruction is zero.

7. A computer according to the claim 5 in which the second specific number stored in the immediate prefixed instruction is zero.

8. A method for performing an immediate calculation to execute an immediate calculation instruction which is a type of calculation instruction by utilizing a computer, comprising:

storing either the calculation instruction incorporating a first immediate value or an immediate prefixed instruction containing a second immediate value in an instruction register, the immediate prefixed instruction being executed prior to the execution of the immediate calculation instruction;

interpreting whether the instruction stored in the instruction register is the calculation instruction or the immediate prefixed instruction in an instruction decoder;

registering the second immediate value contained in the immediate prefixed instruction in a second immediate register in cases where the instruction decoder interprets the instruction stored in the instruction register to be the immediate prefixed instruction;

setting a flag in a prefix state flag when the second immediate value in the immediate prefixed instruction is stored in the second immediate register and resetting the flag when the execution of the calculation instruction is finished;

concatenating first serial bits forming the first immediate value in the calculation instruction stored in the instruction register with second serial bits forming the second immediate value in the immediate prefixed instruction in a concatenation unit in cases where the flag in the prefix state flag is set;

generating the immediate value concatenated in the concatenation unit as a first constant;

extending the number of bits represented by the first immediate value which is contained in the immediate calculation instruction stored in the instruction register to the number of bits represented by the first constant without changing the first immediate value in a bit extender in cases where the instruction decoder interprets the instruction stored in the instruction register to be the calculation instruction;

generating the first immediate value extended by the bit extender as a second constant;

selecting the first constant generated in the concatenation unit in a constant selector in cases where the flag in the prefix state flag is set and selecting the second constant generated in the bit extender in the constant selector in cases where the flag in the prefix state flag is reset;

judging whether or not the instruction stored in the instruction register is the immediate calculation instruction in a judgement unit; and performing the immediate calculation to process the constant selected in the constant selector in cases where the judgement unit judges that the immediate calculation instruction is stored in the instruction register.

* * * * *